Dec. 29, 1959     F. O. LUENBERGER     2,919,359
DYNAMOELECTRIC MACHINE PROVIDED WITH SEALING
MEANS, AND PROCESS FOR MAKING SAME
Filed March 4, 1957     2 Sheets-Sheet 1

FREDERICK O. LUENBERGER
INVENTOR.

BY Flam and Flam

ATTORNEYS.

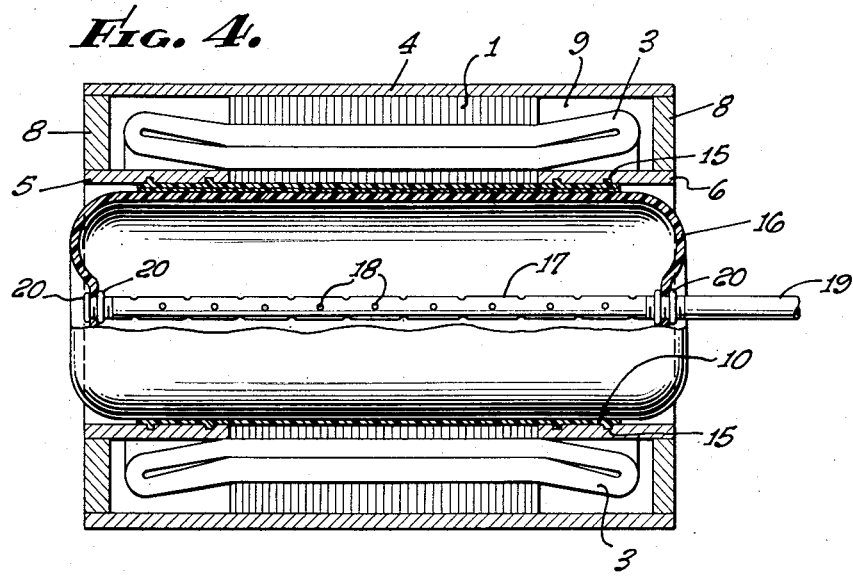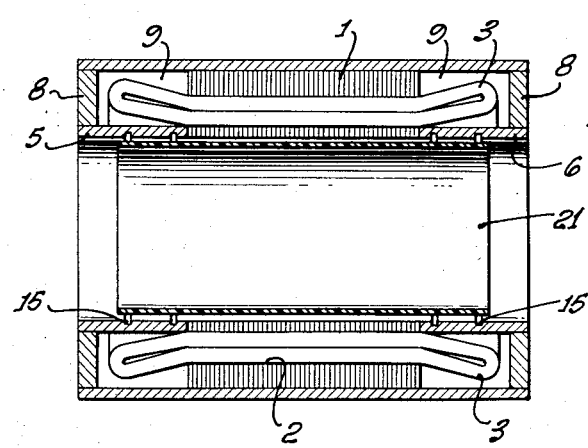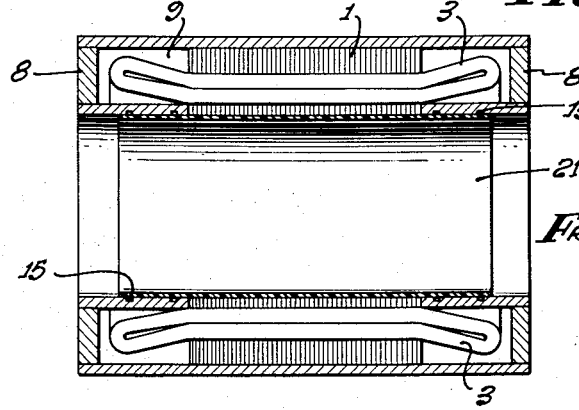

United States Patent Office 2,919,359
Patented Dec. 29, 1959

2,919,359

DYNAMOELECTRIC MACHINE PROVIDED WITH SEALING MEANS, AND PROCESS FOR MAKING SAME

Frederick O. Luenberger, Los Angeles, Calif., assignor to U. S. Electrical Motors, Inc., Los Angeles, Calif., a corporation of California Application March 4, 1957, Serial No. 643,624

4 Claims. (Cl. 310—86)

This invention relates to dynamoelectric machines, and particularly to submersible motors in which the stator space accommodating the stator windings is sealed by aid of a liner within the stator bore.

This application is a continuation-in-part of a prior application filed on July 5, 1955, under Serial No. 519,762, and entitled, "Sealed Dynamoelectric Machines and Process for Making Same."

In said prior application, a tubular plastic member is inserted in the stator bore and caused to be adhered to the inner periphery thereof by aid of a thermosetting adhesive. The plastic tube may be formed of a sheet, with overlapping edges, or else a seamless tubular element may be used. The plastic mentioned in said application is a polyester, and the thermoplastic cement is designated as an epoxy-type of adhesive.

It is one of the objects of this invention to improve the waterproof sealing properties of the structure. For this purpose, a specific type of plastic is used, through which penetration of moisture is entirely eliminated, even when its thickness is about .005 inch.

One suitable material is known as "Teflon" which is a trade name for polytetrafluoroethylene; or use may be made of a similar polymerized ethylene composition.

It is another object of this invention to ensure that this plastic liner will be firmly adhered to the inner surface of the bore, and will thereby serve most effectively as a seal. To accomplish this, those surfaces of the plastic material which are to be adhered, are etched; and these surfaces are subjected to substantial pressure.

It is still another object of this invention to facilitate the application of the plastic liner, and particularly by the expansion of the liner to fit the stator bore, by the aid of fluid pressure.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Fig. 4 is a view similar to Fig. 3, illustrating one of the steps in the process of assembling the plastic liner in place;

Fig. 5 is a longitudinal sectional view, illustrating a step in an alternative method of assembling the liner with the interior surface of the stator structure; and Fig. 6 is a view similar to Fig. 5, but illustrating the completion of the alternative process of constructing the stator structure.

Figure 1:
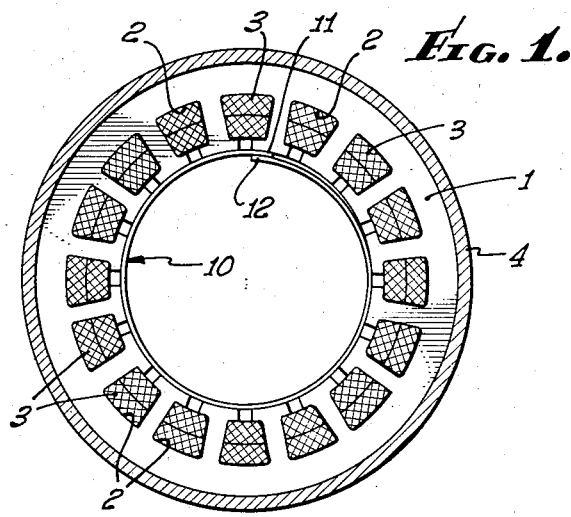
Figure 1 is a cross-sectional view, somewhat diagrammatic, of a stator for a dynamoelectric machine incorporating the invention.
Figure 2:
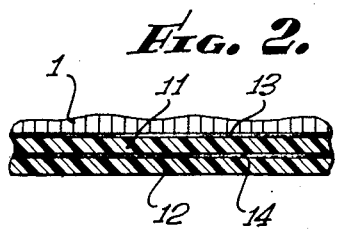
Fig. 2 is an enlarged fragmentary sectional view illustrating the manner in which the overlapped edges of the liner are arranged in relation to the stator laminations.
Figure 3:
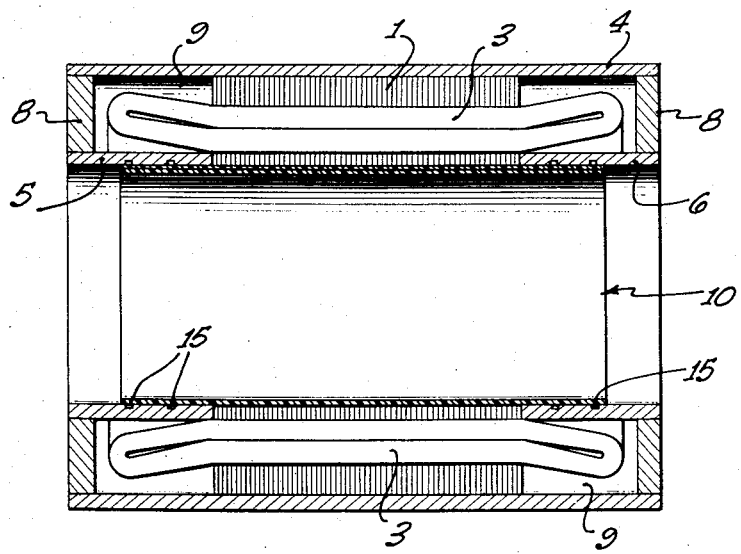
Fig. 3 is a longitudinal sectional view of the stator illustrated in Fig. 1.

In the form of the invention shown in Figs. 1, 2 and 3, the stator structure is shown as including a stack of laminations 1 having slots 2 in which there are accommodated the stator windings 3.

The stack of laminations 1 is held firmly within a frame 4.

To form reinforcing elements, rings or tubes 5 and 6 are provided at each end of the stack of laminations 1. The interior surfaces of these tubes form continuations of the internal diametrical surface of the laminations 1, formed by the edges of the laminations. Rings 8 at each end of the frame 4 serve to form a complete annular enclosure 9 for that portion of the stator structure in which the windings 3 are disposed. The manner in which the rings 8, tubes 5 and 6, and frame 4 are assembled is not described, since the specific structure is not material in considering the present invention; and these elements are accordingly shown quite diagrammatically in these figures.

In order to seal the annular space 9 against ingress of moisture, use is made of a sheet 10 of plastic material. This sheet 10 is disposed in the interior of the bore shown in Fig. 1 with the overlapping edges 11 and 12. The extent of overlap may be about one-half inch. The outer periphery of this tubular member is firmly adhered to the interior edges of the stator stack 1, as well as to the interior surfaces of the reinforcing rings 5 and 6.

Preferably the material used for the plastic member 10 is a polymerized ethylene, such as polytetrafluoroethylene. This material is sometimes known by the trade name "Teflon."

The exposed surface of this specific plastic material is ordinarily incapable of being adhered to metal or other plastic. For overcoming this difficulty, those areas of the sheet 10 which are intended to be adhered, are etched in an appropriate manner; and an epoxy-type of thermosetting adhesive material is used at the joints. This adhesive material is formed, for example, as a layer 13 (Fig. 2) between the outer surface of the sheet 10 and the interior bore of the stator structure. An adhesive layer 14 is also disposed between the overlapping edges 11 and 12.

In order to provide a proper seal by virtue of the adhering parts, pressure is applied to the interior of the plastic sheet 10, after the adhesive layers 13 and 14 are applied. This pressure is exerted while the structure is heated to set the adhesive material. This heating is continued for the required interval and then the pressure may be relieved.

The thickness of the sheet 10 may be from .005 inch to .015 inch. This makes it possible to maintain a small air gap in the dynamoelectric machine.

The "Teflon" material is moisture-proof. It will isolate the space 9 against ingress of water. This is especially important when the stator structure is used in a submersible motor.

The plastic sheet 10 is sufficiently long to extend well beyond the stack 1 and into the tubes 5 and 6, as shown most clearly in Fig. 3. The inner surfaces of these tubes 5 and 6 may each carry one or more annular grooves 15 in which adhesive may be placed. In this way, it is assured that even upon the application of sufficient pressure to urge the sheet 10 into intimate contact with the bore of the stator, there will be enough adhesive to form a good sealing bond between the sheet 10 and the tubes 5 and 6. These grooves thus ensure that the adhesive cannot be entirely squeezed out by the internal pressure.

It has been found that the "Teflon" material is deformable but not elastic, and will not recover completely to its original shape. The reinforcing tubes 5 and 6 and the stator laminations 1 serve to support the "Teflon" liner, even if it be somewhat distorted or stretched.

In the event of the fracturing of the liner material during processing, the area may be patched by adhesively bonding a piece of the material over the damaged area.

In order to urge the sheet 10 with a firm pressure against the interior surfaces of the rings 5 and 6, as well as of the laminations 1, use is made of an inflatable bag 16 as of thin rubber. This bag may be inserted within the plastic material 10 and then expanded by air pressure or other form of fluid pressure.

For this purpose, the inflatable rubber bag 16 is provided with a supply pipe 17 having apertures 18 through which compressed air may be discharged, supplied from an external source connected to the conduit 19 leading to pipe 17. The ends of the bag 16 are provided with apertures. The edges of these apertures enter between the spaced flanges 20 disposed on the supply pipe 17. In this way, a fluid-tight connection can be made between the supply pipe 17 and the bag 16.

As much pressure as desired may be exerted within the bag 16 for urging the plastic sheet 10 firmly outwardly against the tubes 5 and 6 and against the edges of the laminations 1.

In the form hereinabove described, the liner 10 is provided by the aid of a sheet of plastic with overlapping edges 11 and 12.

In order to obviate overlapping edges, a seamless tubing material 21 of "Teflon" or the like may be provided as in the form shown in Figs. 5 and 6. The tube 21 is formed of slightly smaller diameter than the internal diameter of the stator structure, say, for example, by .010 inches. In this way, it is readily insertable within the structure. The exterior tube surface is etched, and then coated with an appropriate thermosetting adhesive, before insertion into the stator structure. Then the tube 21 may be expanded by pressure as hereinabove described to form the liner shown in Fig. 6.

The tube 21 in the expanded position of Fig. 6 is firmly adhered to the metal surfaces and remains in firm contact therewith.

I claim:

1. In combination: a stator structure having an interior surface defined by the magnetic material of the stator; a liner of a polymerized ethylene plastic having a thickness between .005 and .015 inch; and a bonding thermosetting adhesive of the epoxy type between the liner and said surface; the adhered surfaces of the liner being etched.

2. In combination: a stator structure having an interior surface defined by the magnetic material of the stator; a liner of a polytetrafluoroethylene plastic having a thickness between .005 and .015 inch; and a bonding thermosetting adhesive of the epoxy type between the liner and said surface; the adhered surfaces of the liner being etched.

3. In combination: a stator structure including a stack of laminations and end reinforcing tubes forming a continuation of the interior surface of the stack; each of said tubes having interior annular grooves; a liner of polymerized ethylene having a thickness between .005 and .015 inch extending into the stator structure; and a bonding thermosetting adhesive of the epoxy type disposed in the grooves and between the liner and the interior surfaces of the stack and of the reinforcing tubes; the adhered surface of the liner being etched.

4. In combination: a stator structure including a stack of laminations and end reinforcing tubes having internal cylindrical surfaces that are continuations of the interior surface of the stack; a liner tube of polytetrafluoroethylene material having a thickness between .005 inch and .015 inch and extending axially into the stack as well as into the end reinforcing tubes; said liner tube being expanded to contact the stack and the reinforcing tubes; and a bonding epoxy resin adhesive disposed between the exterior of the liner tube and the interior surfaces of the stack and of the reinforcing tubes; the exterior surface of the liner tube being etched to ensure adhesion between the stack and reinforcing tubes.

References Cited in the file of this patent
UNITED STATES PATENTS

| | | |
|---|---|---|
| 2,340,452 | Child | Feb. 1, 1944 |
| 2,573,126 | Andrus | Oct. 30, 1951 |
| 2,745,778 | Garten | May 15, 1956 |
| 2,777,962 | Maynard | Jan. 15, 1957 |